US009235716B1

(12) United States Patent
Brucker et al.

(10) Patent No.: US 9,235,716 B1
(45) Date of Patent: Jan. 12, 2016

(54) AUTOMATING POST-HOC ACCESS CONTROL CHECKS AND COMPLIANCE AUDITS

(71) Applicants: Achim D. Brucker, Karlsruhe (DE); Helmut Petritsch, Karlsruhe (DE)

(72) Inventors: Achim D. Brucker, Karlsruhe (DE); Helmut Petritsch, Karlsruhe (DE)

(73) Assignee: SAP SE, Walldorf (DE)

( * ) Notice: Subject to any disclaimer, the term of this patent is extended or adjusted under 35 U.S.C. 154(b) by 20 days.

(21) Appl. No.: 14/326,675

(22) Filed: Jul. 9, 2014

(51) Int. Cl.
*G06F 12/00* (2006.01)
*G06F 21/60* (2013.01)

(52) U.S. Cl.
CPC ..................... *G06F 21/604* (2013.01)

(58) Field of Classification Search
CPC .............. G06F 17/30463; G06F 17/30864; G06F 17/30398; G06F 21/31; G06F 21/604; H04L 63/20
USPC .................. 726/1, 16; 707/713, 758, 759
See application file for complete search history.

(56) References Cited

U.S. PATENT DOCUMENTS

| | | | | |
|---|---|---|---|---|
| 7,734,682 | B2 * | 6/2010 | Aubry | G06F 21/604 709/203 |
| 8,056,802 | B2 * | 11/2011 | Gressel | G06Q 10/02 235/375 |
| 8,200,527 | B1 * | 6/2012 | Thompson | G06Q 10/0639 705/7.38 |
| 8,473,505 | B2 | 6/2013 | Brucker et al. | |
| 8,560,836 | B2 * | 10/2013 | Roegner | G06F 21/6218 713/155 |
| 2003/0159070 | A1 * | 8/2003 | Mayer | G06F 21/53 726/22 |
| 2004/0010709 | A1 * | 1/2004 | Baudoin | G06Q 40/08 726/25 |
| 2005/0182958 | A1 * | 8/2005 | Pham | G06F 21/51 726/22 |
| 2008/0022362 | A1 * | 1/2008 | Hinton | G06F 17/30876 726/2 |
| 2008/0098453 | A1 * | 4/2008 | Hinton | H04L 63/20 726/1 |
| 2008/0270802 | A1 * | 10/2008 | Ashley | G06F 21/10 713/184 |
| 2009/0077105 | A1 * | 3/2009 | DeAnna | G06F 9/465 |
| 2010/0251329 | A1 * | 9/2010 | Wei | H04L 63/1408 726/1 |
| 2010/0332504 | A1 | 12/2010 | Brucker et al. | |
| 2011/0314261 | A1 * | 12/2011 | Brucker | G06F 21/6218 712/207 |
| 2012/0284767 | A1 * | 11/2012 | Hockings | H04L 63/20 726/1 |
| 2013/0218911 | A1 * | 8/2013 | Li | G06F 21/604 707/754 |
| 2014/0068697 | A1 * | 3/2014 | Brucker | G06F 11/3604 726/1 |

OTHER PUBLICATIONS

U.S. Appl. No. 13/925,051, filed Jun 24, 2013, Brucker et al.
U.S. Appl. No. 13/932,357, filed Jul. 1, 2013, Brucker et al.
U.S. Appl. No. 13/932,388, filed Jul. 1, 2013, Brucker et al.

* cited by examiner

*Primary Examiner* — Thu Ha Nguyen
(74) *Attorney, Agent, or Firm* — Fish & Richardson P.C.

(57) ABSTRACT

Methods, systems, and computer-readable storage media for post-hoc analysis of access control decisions, where actions include receiving a request to analyze an access control request, for which an access control decision has been provided based on a policy, retrieving information associated with the access control request from a log, the information including a first security state version and a time, determining a time interval based on the time and an audit policy, retrieving information associated with at least a second security state version based on the time interval, and evaluating the access control request based on information of the first security state and information of the second security state to provide a post-hoc access control decision.

20 Claims, 6 Drawing Sheets

AUTOMATING POST-HOC ACCESS CONTROL CHECKS AND COMPLIANCE AUDITS

BACKGROUND

Modern enterprise systems, e.g., enterprise resource planning (ERP) systems, customer relationship management (CRM) systems, enforce a variety of different and complex security policies. Moreover, more and more enterprises operate in regulated markets and, thus, need to prove that their information technology (IT) systems comply with applicable compliance regulations.

The compliance regulations can include complex security and compliance policies that change frequently. This can result in frequent, unintentional violations of policies, e.g., users previously permitted to access a resource are now not permitted to access the resource due to a policy change. As a result, administrators and/or auditors have to dig through numerous logged accesses for incidents of policy violations, and filter out unintentional incidents caused by recent changes in security policies and inaccurate, or outdated policies.

SUMMARY

Implementations of the present disclosure include computer-implemented methods for providing post-hoc access control checks. Implementations include actions of receiving a request to analyze an access control request, for which an access control decision has been provided based on a policy, retrieving information associated with the access control request from a log, the information including a first security state version and a time, determining a time interval based on the time and an audit policy, retrieving information associated with at least a second security state version based on the time interval, and evaluating the access control request based on information of the first security state and information of the second security state to provide a post-hoc access control decision.

These and other implementations optionally include one or more of the following features: the second security state version includes a security state that was active within at least a portion of the time interval; actions further include selectively filtering the access control request from a list of potential policy violations based on the post-hoc access control decision; actions further include: receiving expert information based on the time interval, transmitting a request for additional information based on the expert information, and receiving the additional information, wherein evaluating the access control request is further based on the additional information; the expert information is received from a knowledge base, and the additional information is received from a user; actions further include, previous to receiving the request to analyze the access control request: receiving the access control request at the time, evaluating the access control request based on the first security state version, which is active at the time, to provide the access control decision, providing details of one or more of the access control request and the access control decision for storage in the log, and transmitting the access control decision for enforcement of the policy based on the access control decision; and information of the first security state and information of the second security state are stored in a security state versioning system.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to automated, post-hoc analysis of access control decisions. More specifically, implementations of the present disclosure store and provide access to versions of security states. In some implementations, an access control decision, e.g., PERMT, DENY, can be reviewed based on a then current (at the time access was requested) security state and/or one or more previous security states. In this manner, adverse access control decisions, e.g., DENY, that resulted from recently changed policies, for example, can be accounted for. In some examples, the post-hoc analysis is automatically performed in response to a request, without requiring user input. Implementations of the present disclosure further provide automated compliance audits of enterprise systems. More specifically, implementations of the present disclosure enable post-hoc analysis of one or more access control decisions to filter at least one access control decision from further investigation during an audit. Accordingly, implementations of the present disclosure enable more flexible and agile of system operations, as well as reducing costs required to issue audit certificates.

Figure 1:
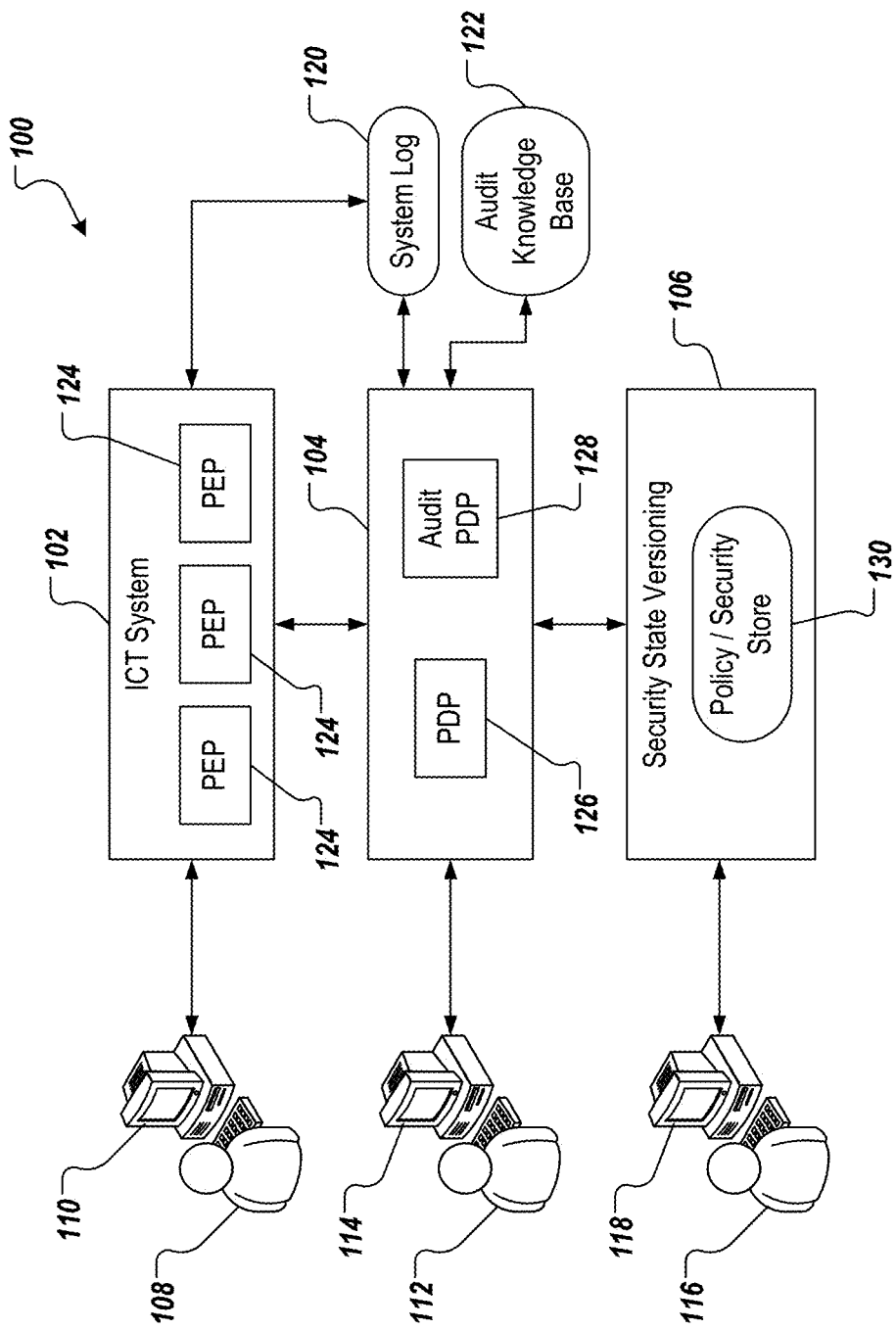
FIG. 1 depicts an example high-level architecture in accordance with implementations of the present disclosure.

FIG. 1 depicts an example architecture 100 in accordance with implementations of the present disclosure. In some implementations, and as described in further detail herein, the example architecture 100 supports versioning of security configurations and logs the runtime access control decisions.

The example architecture 100 includes an information and communications technology (ICT) system 102, a policy enforcement system 104, and a security state versioning system 106. In some examples, the ICT system 102 includes one or more enterprise systems, e.g., an enterprise resource planning (ERP) system, a customer relationship management (CRM) system. In some examples, the ICT system 102, the policy enforcement system 104, and/or the security versioning state system 106 can be provided by one or more server systems.

The example architecture 100 includes a user 108 using a computing device 110, e.g., a client-side computing device, to interact with the ICT system 102. For example, the user 108 can be an employee of the enterprise, and can use the computing device 110 to access the ERP and/or CRM systems. The example architecture 100 includes a user 112 using a computing device 114, e.g., a client-side computing device, to interact with the policy enforcement system. For example, the user 112 can be an auditor that uses the computing device 114 to access the policy enforcement system 104, e.g., to audit compliance with one or more policies or regulations. The example architecture 100 also includes a user 116 using a computing device 118, e.g., a client-side computing device, to interact with the security state versioning system 106. For example, the user 116 can be an administrator of the enterprise, and can use the computing device 118 to administer one or more policies, e.g., add, remove and/or edit access control constraints of the one or more policies The example environment 100 further includes a system log 120 and an audit knowledge base 122. In some examples, the system log 120 records interactions between users, e.g., the user 108, and the ICT system 102. For example, when a user requests access to a resource, the request and any relevant data, e.g., user ID, time, date, resource ID, request result (PERMIT, DENY) can be recorded in the system log 120. For example, the system log 120 stores, during runtime, all information that might be necessary to perform an audit during a post-hoc system audit. In some examples, the system log 120 includes computer-readable memory.

In some examples, the policy enforcement system 104 can interact with the system log 120, e.g., store request results (PERMIT, DENY), retrieve log data for an audit. In some examples, the audit knowledge base 122 provides a formalization of the expert knowledge of audit and security experts. In some implementations, information stored in the audit knowledge base 122 can be retrieved to support the automation of the post-hoc audit by guiding the auditor, e.g., the user 112, and providing additional expert knowledge, e.g., by asking additional questions. The answers to the additional questions can be used during a re-play of access requests, described in further detail herein. In some examples, the audit knowledge base 122 includes computer-readable memory.

Although not depicted in FIG. 1, components of the example environment 100 can communicate with one another using one or more communication channels. For example, one or more of the ICT system 102, the policy enforcement system 104, the security state versioning system 106, the computing devices 110, 114, 118, the system log 120, and the audit knowledge base 122 can communicate using a network, e.g., a large computer network, such as a local area network (LAN), a wide area network (WAN), the Internet, a cellular network, or a combination thereof.

In the depicted example, the ICT system 102 includes a plurality of policy enforcement points (PEPs) 124. In some examples, PEPs 124 can be distributed across the ICT system 102. For example, PEPs can be embedded into different services of the ICT system 102. In some examples, each PEP 124 communicates with a central policy decision point (PDP). In the example of FIG. 1, a PDP 126 is provided in the policy enforcement system 104. In some examples, at runtime, e.g., when the system is operating and a user is able to request access to data, the PDP 126 evaluates access control requests received from any of the PEPs 124, and, in accordance with implementations of the present disclosure, determines whether the user request is to be granted or denied, based on the current security state, e.g., the current configuration for enforcing security and/or compliance policies, and/or one or more previous security states. For example, a PEP 124 can receive a request from a user to access a resource, e.g., application, data, and can send an access control request to the PDP 126. In some examples, the PDP 126 determines any attributes that are required to resolve the access control request, obtains values for the attributes, and makes an access control determination based on the attributes. In some examples, the PDP 126 provides an access control decision, e.g., PERMIT, DENY, to the PEP 124 that issued the access control request. In some examples, the PEP 124 enables or prevents user access to the resource, e.g., application, data, based on the access control decision.

In the example of FIG. 1, the policy enforcement system 104 further includes an audit PDP 128. In some implementations, the audit PDP 128 supports an auditor, e.g., the user 112, during a post-hoc compliance or security audit, e.g., after access control requests have been received and responded to. In some examples, the audit PDP 128 enables the auditor to replay access control requests with respect to different versions of the security state. For example, the audit PDP 128 enables the auditor to replay an access control request under a first security state (X1), in which the user request is granted, and/or under a second security state (X2), in which the user request is denied.

In some implementations, the security state versioning system 106 stores all configurations that describe the current security policy, e.g., the access control policy, a user-role configuration, etc. In some examples, the security state versioning system 106 includes a policy/security store 130 to store this information. In accordance with implementations of the present disclosure, information stored in the policy/security store 130 is versioned. That is, the policy/security store 130 stores the history of changes to the security state, and enables access to different versions of the security state. In some examples, the policy/security store 130 includes computer-readable memory.

As described herein, enterprise systems need to enforce a variety of different and complex security policies. Such security policies are implemented to ensure compliance with applicable regulations, e.g., the Health Insurance Portability and Accountability Act (HIPAA), in the health care sector, Basel II, in the financial sector. Such compliance regulations, in hand with the increased awareness of information technology (IT) security, result in complex and dynamic security and compliance policies. Security and compliance policies change frequently, which results in frequent, unintentional violations of policies. For example, a user is no longer permitted to access a resource that the user was previously permitted to access due to a policy change, and a violation occurs in response to the user attempting to access the resource. In response to such violations, administrators and other responsible persons have to dig through numerous, logged accesses, which could indicate an incident, and filter out unintentional incidents, e.g., incidents caused by changes in security policies, and inaccurate or outdated policies. There is a significant cost required for manual system audits.

Implementations of the present disclosure are generally directed to automated analysis of post-hoc access control decisions, and automated compliance audits of enterprise systems. More particularly, implementations of the present disclosure provide versioning of the security state of an enterprise system. In some examples, the security state includes the system configuration to enforce security and/or compliance policies. In accordance with implementations of the present disclosure, a history of information used by the PDP at runtime is maintained. For example, and as described above, the PDP is the component that, at runtime, decides whether a specific access request to a resource and/or data should be granted or denied. In some examples, access control policies are defined before access, and the PDP determines, at access, whether a user request to access a resource is to be granted or denied.

Implementations of the present disclosure enable post-access analysis of access control requests. In some examples, the post-access analysis uses information about the security state as it was at-access, and also uses the history of the security state before and/or after the access request, i.e., the full history of the security state. In other words, implementations of the present disclosure enable analysis of access control requests for arbitrary time ranges and intervals. This, for example, enables an access control request to be replayed in one or more security states, e.g., the security state at the access attempt, an earlier security state, a later security state.

As discussed above, policies are defined pre-access and evaluated at-access. Implementations of the present disclosure enable the use of audit policies that can be executed post-access. In some examples, an audit policy can use information that becomes available after the actual access evaluation, e.g., granted, denied. In some examples, and as described in further detail herein, the audit policy and can query the policy state over time ranges and intervals. Consequently, an audit policy evaluation is not required to be performed within a certain time frame. In some implementations, the audit policy can provide for human input. For example, for information hard or impossible to determine by a machine, e.g., ethical considerations or human evaluation, a human can be asked to provide an assessment, e.g., about the situation the access was executed in.

Figure 2:
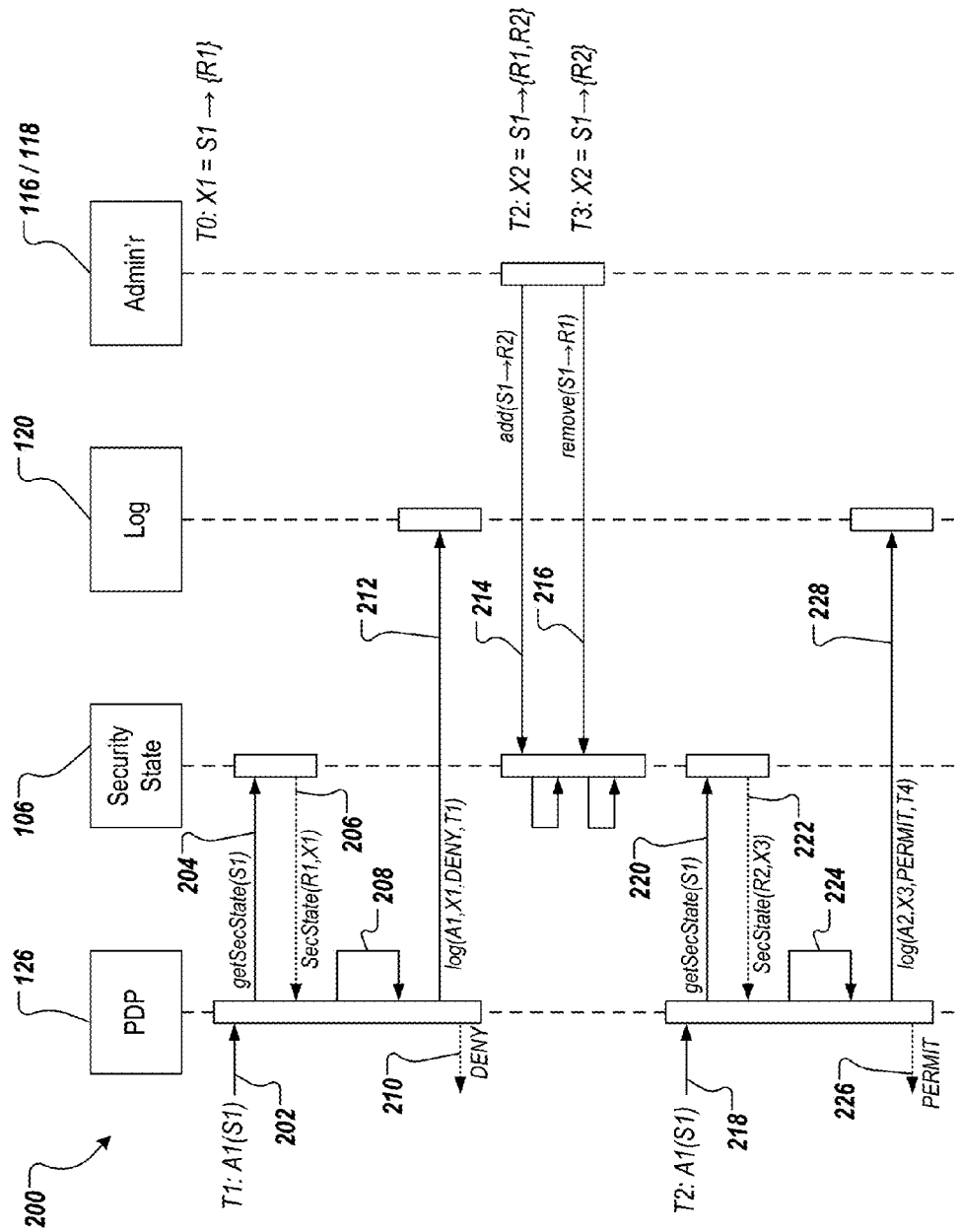
FIGS. 2-4 depict example protocols in accordance with implementations of the present disclosure.

FIG. 2 depicts an example protocol 200 in accordance with implementations of the present disclosure. The example protocol 200 represents an example business scenario, in which two access requests are submitted by the same user, and between the access requests, the security policy changes. In some examples, example protocol 200 is based on a simplistic access control model, in which the security state is only define by a user-role mapping, e.g., a mapping of unique user IDs to one or more roles, each role having respective levels of permission to access one or more resources. In some examples, the example protocol 200 can be executed using one or more components of the example architecture 100 of FIG. 1.

At time T0, the current version of the security state is version X1, in which a subject S1 is assigned a role R1. In the example protocol 200, an access control request A1 is received (202) from a PEP 124 at time T1 by the PDP 126. For example, the user 108 can request access to a resource, and a corresponding PEP 124 can submit the access control request A1 to the PDP 126. Accordingly, the access control request A1 identifies a subject S1, e.g., the user requesting access. In some examples, the PDP 126 evaluates the access control request A1 in view of the then current security policy, which is provided in version X1. The PDP 126 requests (204) and receives (206) the security state for the subject S1, e.g., from the security state versioning system 106. More specifically, the PDP 126 retrieves the role R1 assigned to the subject S1 in the version X1. In this example, the PDP 126 evaluates (208) the access request A1 based on the role R1 and determines that the access request R1 is to be denied. The PDP 126 sends (210) a DENY response, e.g., to the PEP 124, and logs (212) the evaluation, e.g., into the system log 120.

At time T2, the security state is changed to version X2, in which the subject S1 is assigned both roles R1 and R2. For example, an administrator, e.g., the user 116 using the computing device 118, requests (214) that the role R2 also be assigned to the subject S1. At time T3, the security state is changed to version X3, in which the subject S1 is assigned only the role R2. For example, an administrator, e.g., the user 116 using the computing device 118, requests (216) that the role R1 be removed from assignment to the subject S1. In this example, time T3 can be less than 24 hours after time T1.

In the example of FIG. 2, an access control request A2 is received (218) from a PEP 124 at time T4 by the PDP 126. For example, the user 108 can request access to a resource, and a corresponding PEP 124 can submit the access control request A2 to the PDP 126. Accordingly, the access control request A2 identifies the subject S1, e.g., the user requesting access. In some examples, the PDP 126 evaluates the access control request A2 in view of the then current security policy, which is provide in version X3. The PDP 126 requests (220) and receives (222) the security state for the subject S1, e.g., from the security state versioning system 106. More specifically, the PDP 126 retrieves the role R2 assigned to the subject S1 in the version X3. In this example, the PDP 126 evaluates (224) the access request A2 based on the role R2 and determines that the access request A2 is to be granted. The PDP 126 sends (226) a PERMIT response, e.g., to the PEP 124, and logs (228) the evaluation, e.g., into the system log 120.

In some implementations, an audit can be performed to, for example, investigate and account for denied requests. For example, an auditor, e.g., the user 112, can interact with the policy enforcement system 104, e.g., using the computing device 114, to perform the audit. In some examples, it can be determined that all denials, e.g., DENY, that are determined to be inconsequential, or low risk are filtered from the audit. An example inconsequential, or low risk denial can include a denial that, if another role assignment for the same subject within 24 hours (24 h) would have permitted the request. Consequently, an audit policy can be provided that removes a denial from consideration in the audit, if another role assignment for the same subject within 24 hours (24 h) would have permitted the request.

Figure 3:
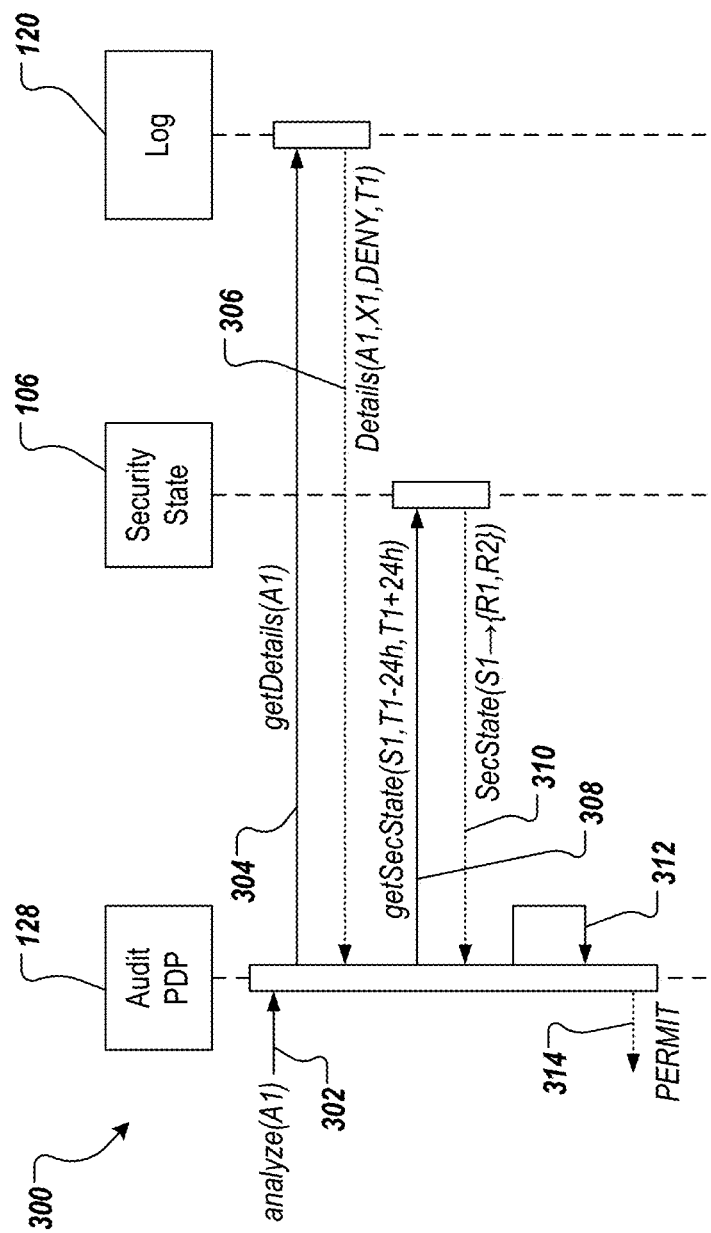

FIG. 3 depicts an example protocol 300 representing an example, automatic audit based on the above-described, example audit policy. More generally, the example protocol 300 represents an example automated audit of compliance with one or more policies to filter out non-critical access failures, e.g., access attempts that were denied.

In some examples, a list of denied access requests can be provided that includes denied access requests that could be considered during an audit, e.g., denied access requests that occurred during a specified period of time and/or for a specified system. In some examples, a request for analysis can automatically be provided for each denied access request in the list of denied access requests, and one or more denied access requests can be filtered (removed) from the list of denied access requests based on the respective analyses. In some examples, the one or more analyses are automatically performed and are based on one or more audit policies. In some examples, a revised list of denied access requests can be provided, and can include only denied access requests that are to be considered during the audit.

In the example of FIG. 3, the audit PDP 128 receives (302) a request to analyze the access control request A1, which is described above with reference to FIG. 2. For example, the access control request A1 can be included in a list of denied access requests that are to be analyzed. The audit PDP 128 requests (304) information associated with the access control request A1 from the system log 120. The system log 120 provides (306) the information associated with the access control request A1 to the audit PDP 128. The audit PDP 128 requests (308) the security state from the security state versioning system 106. More particularly, the audit PDP 128 requests the security state based on the example audit policy described above. That is, the audit PDP 128 requests the security state for all roles of the subject S1 from 24 hours before to 24 hours after the access control request A1 was submitted, e.g., time T1. Because, in the example of FIG. 2, the version X3 was created within 24 hours after time T1, the security state versioning system 106 returns (310) the roles R1 and R2. The audit PDP 128 evaluates (312) the denied access request based on the roles R1 and R2. Given role R2, the audit PDP 128 evaluates to PERMIT. Consequently, the audit PDP 128 indicates (314) PERMIT, the access control request A1 can be removed from the list of denied access requests, and the access control request A1 is removed from consideration during the audit.

The examples described above with reference to FIGS. 2 and 3, represent a relatively simplistic use case. It is appreciated, however, that implementations of the present disclosure can be applied in more complex use cases, and access control models, e.g., models, in which access control is based on more than just roles. A healthcare application can be considered, for example, in which a physician must have a treatment relationship with a patient to access the patient's information. The physician may request access to the patient's health record, for example, where the system, e.g., the policy enforcement system 104, is informed about a treatment relationship only after the access is requested, e.g., an emergency situation, in which the patient is not able to confirm the treatment relationship. Consequently, the physician's access request may at first be denied. In this example, an audit policy can be defined, which removes all denied request accesses from the list of denied access requests, where a treatment relationship was created within the 24 hours after the access request, for example.

In some implementations, an audit can be assisted based on information provided from a knowledge base, e.g., the audit knowledge base 122. For example, an auditor, e.g., the user 112, is tasked with investigating a denied access request, where the access request was denied, because a non-managerial user attempted to access confidential information during the absence of a senior manager. In this example, the auditor makes use of the audit knowledge base during the investigation.

Figure 4:
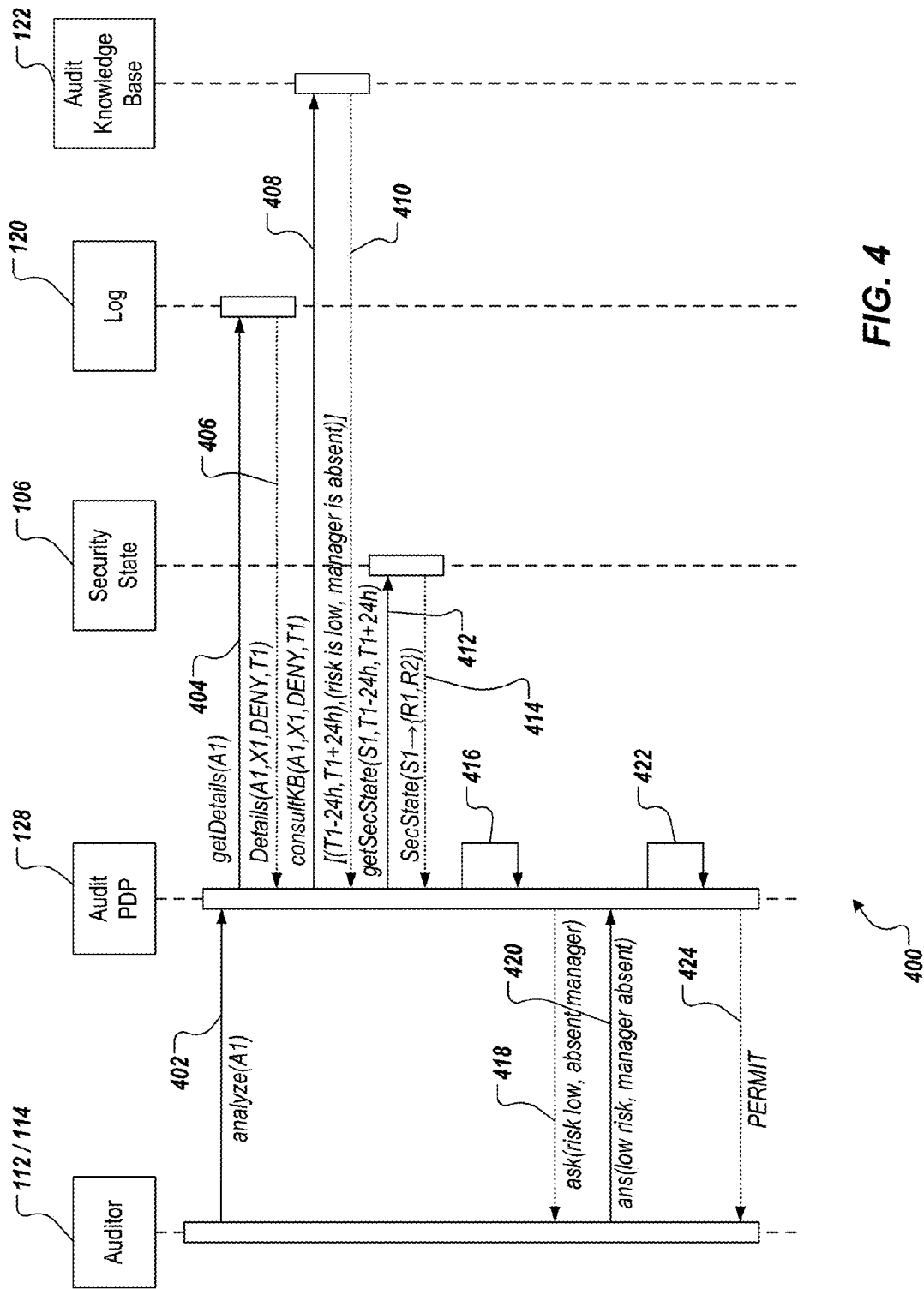

FIG. 4 depicts an example protocol 400 based on the above-described, example investigation. The example protocol 400 represents an example assisted system audit, e.g., assisted by the audit knowledge base 122, in accordance with implementations of the present disclosure.

An auditor, e.g., the user 112 using the computing device 114, sends (402) a request for analysis of the access control request A1. The audit PDP 128 receives the request to analyze the access control request A1, which is described above with reference to FIG. 2. The audit PDP 128 requests (404) information associated with the access control request A1 from the system log 120. The system log 120 provides (406) the information associated with the access control request A1 to the audit PDP 128.

The audit PDP 128 requests (408) expert information from the audit knowledge base 122. In some examples, the audit knowledge base 122 can provide expert information that can, for example, recommend situations that the auditor 112, 114 should take into account during the audit. In some examples, the expert information is identified based on the subject and/or details of the access control request. In the depicted example, the audit knowledge base 122 sends (410) a response indicating situations that the auditor should take into account: check whether the non-managerial user would have been able to access the information in an interval of 24 hours before and 24 hours after the denied access request; check whether the access attempt was done to fulfill a low-risk activity that requires managerial approval, e.g., signing a contract up to a certain limit; and check whether a manager was not available at that time.

The audit PDP 128 requests (412) the security state from the security state versioning system 106. More particularly, the audit PDP 128 automatically requests the security state based on the example audit policy described above. That is, the audit PDP 128 requests the security state for all roles of the subject S1 from 24 hours before to 24 hours after the access control request A1 was submitted, e.g., time T1. Because, in the example of FIG. 2, the version X3 was created within 24 hours after time T1, the security state versioning system 106 returns (414) the roles R1 and R2. The audit PDP 128 evaluates (416) the denied access request based on the roles R1 and R2 and the expert information. If, for example, it is determined that the subject S1 was assigned an appropriate role to be granted access, the audit PDP 128 can return PERMIT to the auditor 112, 114. However, in this example, it can be determined that the subject S1 was not assigned an appropriate role to permit the access request, e.g., a role R3, and the access control decision would result in DENY. In response to this, and in view of the expert information provided from the audit knowledge base 122, the audit PDP 128 sends (418) a request to the auditor 112, 114 to answer the questions: was the risk low, and was the manager absent. In the depicted example, the auditor 112, 114 sends (420) a response indicating low risk and manager absent. Given the information low risk and manager absent, the audit PDP 128 evaluates (422) to PERMIT. Consequently, the audit PDP 128 indicates (424) PERMIT to the auditor 112, 114.

In the example of FIG. 4, it is determined that the additional information given by the auditor 112, 114 was sufficient to PERMIT the access request. Consequently, the previously denied access request can be removed from the list of denied access requests. If, on the other hand, the additional information was not sufficient, e.g., the risk was not low and/or the manager was not absent, the denied access request is not removed from the list of denied access requests, and must be further analyzed as a potential policy violation.

Figure 5:
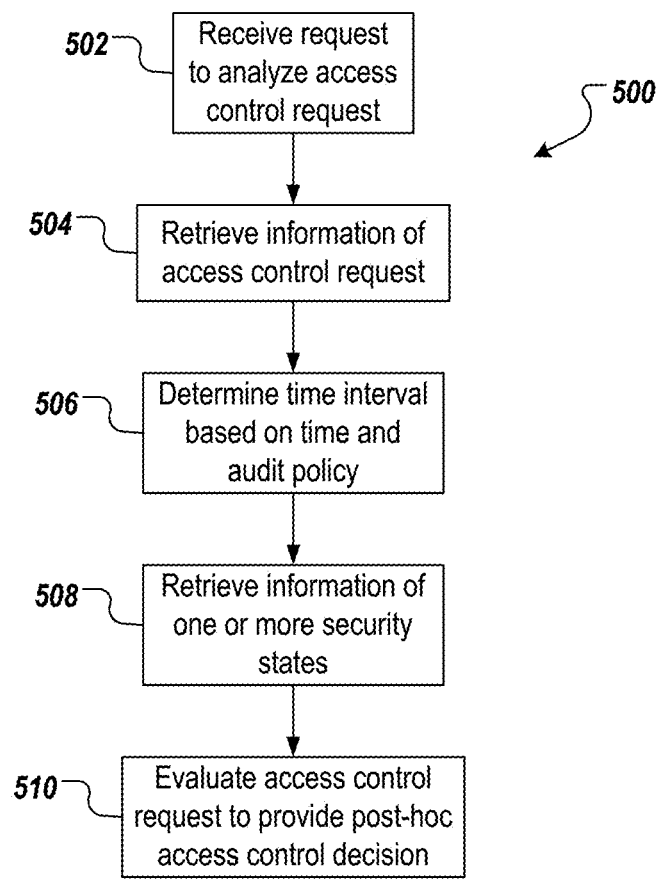
FIG. 5 depicts an example process that can be executed in accordance with implementations of the present disclosure.

FIG. 5 depicts an example process 500 that can be executed in accordance with implementations of the present disclosure. In some examples, the example process 500 can be provided as one or more computer-executable programs executed using one or more computing devices.

A request to analyze an access control request is received (502). For example, an audit PDP, e.g., the audit PDP 128 of FIG. 1, receives the request to analyze an access control request. In some examples, the access control request is one, for which an access control decision has been provided. For example, the access control request can have been previously evaluated based on an access control policy, and an access control decision already provided. Information associated with the access control request is retrieved (504). For example, details of the access control request can be retrieved from a system log, e.g., the system log 120 of FIG. 1. In some examples, the detail includes a first security state version and a time, the first security state version being an active security state at the time.

A time interval is determined based on the time and an audit policy (506). In some examples, the audit policy defines parameters for determining the time interval based on the time, e.g., 24 hours before, and/or 24 hours after. In some examples, the audit policy defines conditions for determining a post-hoc access control decision based on one or more security states that were active at some point within the time interval. Information associated with at least a second security state version is retrieved based on the time interval (508). In some examples, the audit PDP retrieves information associated with one or more security states that were active in at some point within the time interval from a security state versioning system, e.g., the security state versioning system 106 of FIG. 1. The access control request is evaluated to provide a post-hoc access control decision (510). In some examples, the access control request is evaluated based on information of the first security state and information of the second security state. In some examples, the post-hoc access control decision is different than the access control decision previously provided for the access control request. For example, and based on the audit policy, a previously provided access control decision can be a DENY decision, while the post-hoc access control decision is provided as a PERMIT decision.

Figure 6:
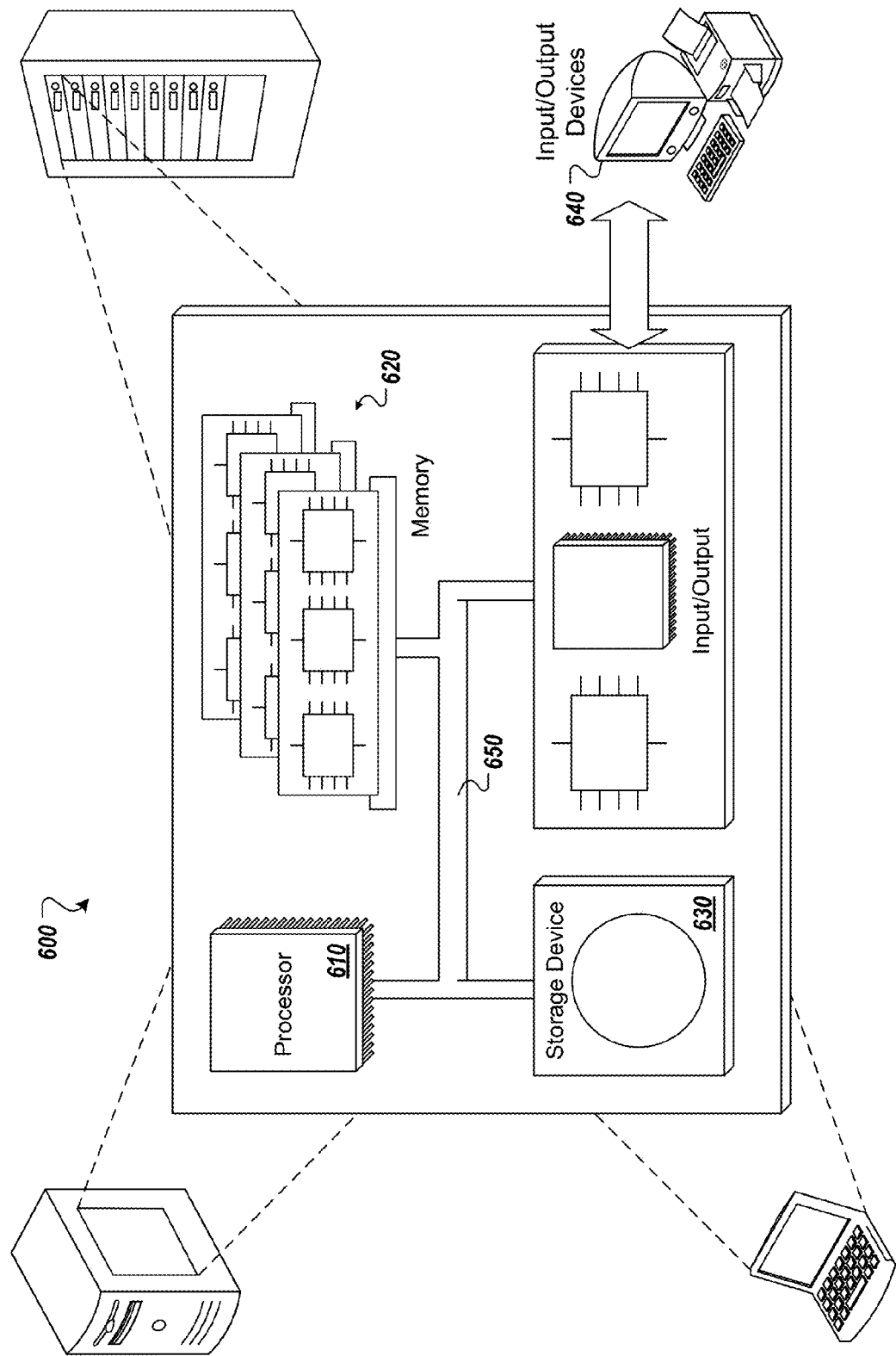
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for post-hoc analysis of access control requests, the method being executed using one or more processors and comprising:
   receiving, by the one or more processors, a request to analyze an access control request, for which an access control decision has been provided based on a policy;
   retrieving, by the one or more processors, information associated with the access control request from a log, the information comprising a first security state version and a time;
   determining, by the one or more processors, a time interval based on the time and an audit policy;
   retrieving, by the one or more processors, information associated with at least a second security state version based on the time interval; and
   evaluating, by the one or more processors, the access control request based on information of the first security state and information of the second security state to provide a post-hoc access control decision.

2. The method of claim 1, wherein the second security state version comprises a security state that was active within at least a portion of the time interval.

3. The method of claim 1, further comprising selectively filtering the access control request from a list of potential policy violations based on the post-hoc access control decision.

4. The method of claim 1, further comprising:
   receiving expert information based on the time interval;
   transmitting a request for additional information based on the expert information; and
   receiving the additional information, wherein evaluating the access control request is further based on the additional information.

5. The method of claim 4, wherein the expert information is received from a knowledge base, and the additional information is received from a user.

6. The method of claim 1, further comprising, previous to receiving the request to analyze the access control request:
   receiving the access control request at the time;
   evaluating the access control request based on the first security state version, which is active at the time, to provide the access control decision;
   providing details of one or more of the access control request and the access control decision for storage in the log; and
   transmitting the access control decision for enforcement of the policy based on the access control decision.

7. The method of claim 1, wherein information of the first security state and information of the second security state are stored in a security state versioning system.

8. A non-transitory computer-readable storage medium coupled to one or more processors and having instructions stored thereon which, when executed by the one or more processors, cause the one or more processors to perform operations for post-hoc analysis of access control decisions, the operations comprising:
   receiving a request to analyze an access control request, for which an access control decision has been provided based on a policy;
   retrieving information associated with the access control request from a log, the information comprising a first security state version and a time;
   determining a time interval based on the time and an audit policy;
   retrieving information associated with at least a second security state version based on the time interval; and
   evaluating the access control request based on information of the first security state and information of the second security state to provide a post-hoc access control decision.

9. The computer-readable storage medium of claim 8, wherein the second security state version comprises a security state that was active within at least a portion of the time interval.

10. The computer-readable storage medium of claim 8, wherein operations further comprise selectively filtering the access control request from a list of potential policy violations based on the post-hoc access control decision.

11. The computer-readable storage medium of claim 8, wherein operations further comprise:
    receiving expert information based on the time interval;
    transmitting a request for additional information based on the expert information; and
    receiving the additional information, wherein evaluating the access control request is further based on the additional information.

12. The computer-readable storage medium of claim 11, wherein the expert information is received from a knowledge base, and the additional information is received from a user.

13. The computer-readable storage medium of claim 8, wherein operations further comprise, previous to receiving the request to analyze the access control request:
    receiving the access control request at the time;
    evaluating the access control request based on the first security state version, which is active at the time, to provide the access control decision;
    providing details of one or more of the access control request and the access control decision for storage in the log; and
    transmitting the access control decision for enforcement of the policy based on the access control decision.

14. The computer-readable storage medium of claim 8, wherein information of the first security state and information of the second security state are stored in a security state versioning system.

15. A system, comprising:
    a computing device; and
    a computer-readable storage device coupled to the computing device and having instructions stored thereon which, when executed by the computing device, cause the computing device to perform operations for post-hoc analysis of access control decisions, the operations comprising:
      receiving a request to analyze an access control request, for which an access control decision has been provided based on a policy;
      retrieving information associated with the access control request from a log, the information comprising a first security state version and a time;
      determining a time interval based on the time and an audit policy;
      retrieving information associated with at least a second security state version based on the time interval; and evaluating the access control request based on information of the first security state and information of the second security state to provide a post-hoc access control decision.

16. The system of claim 15, wherein the second security state version comprises a security state that was active within at least a portion of the time interval.

17. The system of claim 15, wherein operations further comprise selectively filtering the access control request from a list of potential policy violations based on the post-hoc access control decision.

18. The system of claim 15, wherein operations further comprise:
   receiving expert information based on the time interval;
   transmitting a request for additional information based on the expert information; and
   receiving the additional information, wherein evaluating the access control request is further based on the additional information.

19. The system of claim 18, wherein the expert information is received from a knowledge base, and the additional information is received from a user.

20. The system of claim 15, wherein operations further comprise, previous to receiving the request to analyze the access control request:
   receiving the access control request at the time;
   evaluating the access control request based on the first security state version, which is active at the time, to provide the access control decision;
   providing details of one or more of the access control request and the access control decision for storage in the log; and
   transmitting the access control decision for enforcement of the policy based on the access control decision.

* * * * *